UNITED STATES PATENT OFFICE.

HERBERT N. McCOY, OF CHICAGO, ILLINOIS, ASSIGNOR TO CARNOTITE REDUCTION COMPANY, OF CHICAGO, ILLINOIS, A CORPORATION OF COLORADO.

ART OF RECOVERING RADIUM.

1,292,341.   Specification of Letters Patent.   Patented Jan. 21, 1919.

No Drawing.   Application filed October 22, 1917.   Serial No. 197,881.

*To all whom it may concern:*

Be it known that I, HERBERT N. McCOY, a citizen of the United States, residing at Chicago, in the county of Cook and State of Illinois, have invented a new and useful Improvement in the Art of Recovering Radium, of which the following is a specification.

My invention relates to the art of recovering radium and particularly to a treatment by which a radium concentrate may be prepared from a radium bearing mass of silicious minerals.

As is well known, radium occurs in very minute quantities in all uranium bearing minerals, the mineral known as carnotite being, however, by far the most important. Pure carnotite, a vanadate of potassium and uranium containing one three-millionth as much radium as uranium, is very rarely found massive, the so-called carnotite of commerce which is produced and extensively worked for the recovery of uranium containing usually but a small proportion (from 3 to 15 per cent.) of pure carnotite, the balance consisting of silica in the form of quartz sand and silicates, together with more or less earthy material.

Two general procedures for the recovery of radium from this so-called carnotite are at present in use. In the one, the radium along the barium, which usually accompanies it, is dissolved in nitric or hydrochloric acid, with or without previous preparatory treatment, leaving behind insoluble quartz sand and silicates. By this procedure (described in United States Bureau of Mines, Bulletin 104, pages 25 and 27) more or less of the uranium and vanadium pass into solution. According to the other procedure the carnotite is treated with sulfuric acid and afterward with water, in such a manner as to bring uranium and vanadium into solution as sulfates and to leave the radium and barium, whose sulfates are insoluble, in the undissolved residue. (See my prior United States Patent No. 1,098,282, granted May 26, 1914). After such treatment the undissolved portion contains in addition to the insoluble sulfates of the radium and barium large amounts of quartz sand and silicates. A large part of the coarser quartz sand may be separated by mechanical means, but the remaining radium bearing residue still contains a very considerable mass of fine quartz sand and silicates. The recovery of radium from this residue has heretofore been accomplished by the conversion of the silica and insoluble silicates into sodium silicate, by treatment with sodium carbonate or sodium hydroxid, the soluble sodium silicate being then dissolved in water, leaving an insoluble radium bearing concentrate largely freed of silica and silicates. This known procedure has many disadvantages, probably the most marked being that part of the radium goes into solution and is lost with the discarded sodium silicate solution.

I have discovered that it is possible to effect a better separation of silica and insoluble silicates from radium sulfate by the action of a water solution of hydrofluoric acid, whereby hydro-fluo-silicic acid is formed and dissolved by the water present, while the radium compound is left in the undissolved residue. The material, before treatment with hydrofluoric acid, contains more or less barium-sulfate, the presence of which is believed to aid in retaining the radium sulfate in the undissolved residue. In accordance with this theory, an ore which is low in barium is believed to be benefited by the addition of about ten pounds of barium-chlorid per ton. I prefer, also, to employ other mineral acids, such as sulfuric and hydrochloric, together with the hydrofluoric acid, these other acids dissolving bases such as aluminum, whose silicates are attacked by the hydrofluoric acid. The presence of sulfuric acid in the batch is also believed to be desirable as insuring the presence of the barium and radium as sulfates.

As illustrative of the procedure to be followed in carrying out my invention, the following example is given: One ton of commercial carnotite, which may, for example, consist of ten per cent. pure carnotite admixed with 90 per cent. sand and earthy material, is ground to 30-mesh and mixed with 600 pounds of concentrated sulfuric acid and 400 pounds of water. The mixture is dried at a temperature of 100° C. until the water has been largely driven off and is then baked at 250° C. The product of this treatment is a green solid containing the sulfates of all bases present, principally vanadium, uranium, aluminum, iron, magnesium, calcium and barium, together with the radium. This green solid is stirred with water, decanted, and the decanted liquor filtered. As the result of this treatment, the green solid becomes resolved into three products, i. e., a green solution, principally composed of the sulfates of vanadium, uranium, aluminum, iron and magnesium, a residual coarse sand, without value, and a fine slime made up of the sulfates of calcium, barium and radium, together with a relatively large proportion of silicious material in the form of fine sand, clay, and other silicates. One ton of the commercial carnotite ore referred to gives from 400 to 600 pounds of this radium-bearing slime. The procedure thus briefly described forms the subject matter of my prior United States patent referred to and produces a radium-bearing mass of silicious matter in the form of a slime well suited for treatment according to my present invention.

This radium-bearing slime concentrate, having a dried weight of the order of 220 pounds and consisting largely of finely divided quartz sand (silica) and silicates of aluminum, iron and magnesium, together with sulfates of calcium and barium, contains in the neighborhood of ten milligrams of radium-sulfate. The 220 pounds (dry weight) of concentrate, wetted with 200 pounds of water, is mixed with 900 pounds of a 30-per cent. solution of hydrofluoric acid and water, (this giving a sufficient proportion of HF for combination with the free and combined silica present in the slime) and 20 pounds of concentrated sulfuric acid, and the whole stirred for several hours, the progress of the reaction being indicated by the rising temperature of the mass. In from three to eight hours the reaction is finished, the silica going into solution as hydro-fluo-silicic acid, while the larger part of the aluminum, iron, magnesium, etc., present is also dissolved as sulfates and hydrofluo-silicates. The undissolved residue, having a dry weight of the order of 20 pounds, contains practically all of the radium, together with the sulfates of calcium and barium, the radium presumably being also present as a sulfate. This last concentrate of radium is then further concentrated and purified according to the known methods.

My method of recovering radium from silicious minerals is decidedly advantageous, for the reason that it offers a means of readily dissolving a very large proportion of silica and silicates from a minute amount of radium-sulfate, the latter being kept in an almost completely insoluble form along with sufficient barium-sulfate to prevent loss of the radium-sulfate, it being believed that the presence of the barium-sulfate holds the radium-sulfate in solid solution or as mixed crystals and thus further diminishes the slight tendency of the radium-sulfate to go into solution.

The process of recovering radium from silicious mineral matter by the use of hydrofluoric acid, as above described, may be applied, in general, to any mixture of silica or silicates containing radium and barium, either in the presence or absence of other bases which usually occur in carnotite. Thus I have successfully separated silica and silicates from radium contained in a carnotite concentrate made from a low grade carnotite sandstone by the process described in my prior United States Patent No. 1,195,698. This concentrate was treated with a water solution of hydrofluoric acid and sulfuric acid in substantially the same manner as above described, the larger part of the carnotite concentrate going into solution, leaving as before a relatively small insoluble residue containing the radium values.

While I have described in some detail one preferred method of carrying out my process, together with the theories which I believe to explain the success of the process, it is understood that my invention is not limited to the precise procedure described nor is dependent upon the accuracy of the theories which I have advanced. On the contrary, my invention is not to be regarded as limited except in so far as such limitations are included within the terms of the accompanying claims, in which it is my intention to claim all novelty inherent in my invention as broadly as is permissible in view of the prior art.

What I claim is:

1. The improvement in the art of recovering radium which consists in treating a radium-bearing mass of silicious matter containing sulfates with hydrofluoric acid, whereby the silicious matter is in large part rendered soluble while the admixed radium compound remains insoluble.

2. The improvement in the art of recovering radium which consists in treating a radium-bearing mass of silicious matter containing sulfates with a dilute aqueous solution of hydrofluoric acid, whereby the silicious matter is in large part converted into a soluble compound and taken into solution while the admixed radium compound remains in the insoluble residue.

3. The improvement in the art of recovering radium which consists in treating a radium-bearing mass of silicious matter containing sulfates with an aqueous solution of hydrofluoric acid of a concentration of approximately 30 per cent.

4. The improvement in the art of recovering radium which consists in treating a radium-bearing mass of silicious matter containing sulfates with approximately the mass of hydrofluoric acid of a concentration of the order of 30 per cent. required for combination with the silica present.

5. The improvement in the art of recovering radium which consists in treating a radium-bearing mass of silicious matter with dilute hydrofluoric acid and in the presence of sulfate ions.

6. The improvement in the art of recovering radium which consists in treating a radium-bearing mass of silicious matter containing sulfates with a mixture or a large proportion of dilute aqueous solution of hydrofluoric acid and a small proportion of mineral acid.

7. The improvement in the art of recovering radium which consists in treating a radium-bearing mass of silicious matter with a mixture of a large proportion of dilute aqueous solution of hydrofluoric acid and a small proportion of sulfuric acid.

8. The improvement in the art of recovering radium from carnotite ore which consists in heating such ore with sulfuric acid, dissolving out the resultant soluble sulfates and treating the residue with a dilute aqueous solution of hydrofluoric acid.

9. The improvement in the art of recovering radium which consists in heating carnotite ore with sulfuric acid, agitating the resultant mass with water, decanting and filtering to produce a radium-bearing slime concentrate and treating this concentrate with a dilute aqueous solution of hydrofluoric acid.

HERBERT N. McCOY.